United States Patent
Scherrer

(10) Patent No.: US 7,601,193 B2
(45) Date of Patent: Oct. 13, 2009

(54) GAS-LIQUID SEPARATOR UTILIZING TURNING VANES TO CAPTURE LIQUID DROPLETS AS WELL AS REDIRECT THE GAS FLOW AROUND A BEND

(75) Inventor: Paul Keith Scherrer, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 596 days.

(21) Appl. No.: 11/437,297

(22) Filed: May 19, 2006

(65) Prior Publication Data
US 2007/0266854 A1    Nov. 22, 2007

(51) Int. Cl.
*B01D 45/08* (2006.01)
(52) U.S. Cl. .............. 55/440; 55/462; 55/466
(58) Field of Classification Search ........... 55/434, 55/440, 443, 462, 466
See application file for complete search history.

(56) References Cited

U.S. PATENT DOCUMENTS

| | | | |
|---|---|---|---|
| 851,494 A | 4/1907 | Chalfant | |
| 2,759,880 A * | 8/1956 | Brown | 208/50 |
| 3,254,475 A * | 6/1966 | Farr et al. | 96/232 |
| 3,656,280 A | 4/1972 | Perry | |
| 5,181,943 A | 1/1993 | Weber | |
| 5,510,017 A | 4/1996 | Abdullayev | |
| 5,882,386 A | 3/1999 | McAferty et al. | |
| 6,171,379 B1 | 1/2001 | Rolland | |
| 6,454,825 B1 | 9/2002 | Cheimets et al. | |
| 7,004,998 B2 | 2/2006 | Scherrer | |

FOREIGN PATENT DOCUMENTS

DE     932403     9/1955

(Continued)

OTHER PUBLICATIONS

Copending U.S. Appl. No. 11/155,756, filed Jun. 17, 2005, "Gas-Liquid Impingement Separators", Inventor Paul K. Scherrer.

(Continued)

*Primary Examiner*—Robert A Hopkins
(74) *Attorney, Agent, or Firm*—Brett L Nelson; Bernard J. Graves, Jr.

(57) ABSTRACT

A gas-liquid separation enhancer includes a plurality of longitudinally extending turning vanes distributed within a bent conduit section. At least a portion of the vanes have a bend that redirects a portion of a flowing gas stream from an initial direction to a final direction. Each of the vanes have a first end and a second end and are positioned in the bent conduit section to direct a portion of any liquid contacting the vanes to either the first end or the second end when the gas-liquid separation enhancer is incorporated into an outlet conduit. The separation is positioned in an outlet conduit such that captured liquid droplets are returned to the vessel from which they originate.

28 Claims, 14 Drawing Sheets

FOREIGN PATENT DOCUMENTS

| | | |
|---|---|---|
| WO | WO 86/01739 | 3/1986 |
| WO | WO 03/095069 | 11/2003 |
| WO | WO 2005/051507 | 6/2005 |
| DE | 2823942 | 10/1979 |
| DE | 36 40 377 | 6/1988 |
| EP | 0 197 060 B2 | 5/1989 |
| EP | 0489575 | 6/1992 |
| GB | 906644 | 9/1962 |
| GB | 2259025 | 3/1993 |

OTHER PUBLICATIONS

International Search Report for WO 05/051507 which corresponds to USP 7,004,998, Jan. 2, 2007.

Abstract of WO 86/01739 in English which corresponds to EP 0 197 060, May 1986.

Abstract of WO 88/04010 in English, which corresponds to DE 36 40 377, Jun. 1988.

International Search Report from co-pending U.S. Appl. No. 11/155,756 (Eastman docket 80072), Feb 2007.

* cited by examiner

GAS-LIQUID SEPARATOR UTILIZING TURNING VANES TO CAPTURE LIQUID DROPLETS AS WELL AS REDIRECT THE GAS FLOW AROUND A BEND

CROSS-REFERENCE TO RELATED APPLICATIONS

This application is related to U.S. Pat. No. 7,004,998, issued Sep. 17, 2003 and to U.S. patent application Ser. No. 11/155,756 filed Jun. 17, 2005.

BACKGROUND OF THE INVENTION

1. Field of the Invention

The present invention is directed to separation of liquid droplets from gas-liquid streams in chemical processes.

2. Background Art

Many chemical processes require take-off of a gas phase from chemical processing equipment such as chemical reactors. In some cases, the nature of the various reactants, products, and by-products facilitate removal of a gas phase substantially free of liquid. However, in other processes, considerable quantities of liquid droplets may be associated with the gas phase, and in the case where the liquid droplets can later solidify, whether due strictly to a phase change or to subsequent reaction, lines and valves may be plugged and require disassembly and cleaning or replacement. Furthermore, in many cases, the liquid droplets may constitute a loss of valuable reactants, intermediate products, or end products. For example, during preparation of polyethylene terephthalate polymers, polymer and oligomer particles may carry over with ethylene glycol and water as the latter are removed from the reactor in a vapor phase.

Many types of devices for liquid removal from gas streams are known, including cyclone separators, chill plates, filters, and the like. Packed columns efficiently remove liquid droplets, for example. However, many of these methods, for instance chill plates, are energy intensive, and others such as packed columns exhibit a severe pressure drop as well as being prone to plugging. In-line filters also suffer from these drawbacks.

Inertial separators or traps make use of the fact that a flowing gas can easily make turns that droplets with large inertia cannot. The droplets that cannot turn with the gas stream because of their inertia strike or impact a target or collecting surface onto which they are deposited. A simple pipe elbow is an example of such a separator. However, such separators are generally efficient only for droplets of materials with large inertia. Since the inertia of the droplets is measured by its mass, the size and density of the droplets is important in determining the removal efficiency.

In U.S. Pat. No. 5,181,943, liquid removal is effectuated by providing a large number of plate-type baffles across the path of a liquid-gas stream, the baffles being substantially parallel but downward sloping, and alternately extending from opposite sides of the separation device, are positioned transverse to the initial direction of flow. This device creates a high surface area serpentine path, and must be quite large if pressure drop is to be low. Since in many cases the separator must be maintained at a specific operating temperature and thus requires considerable external insulation, such devices are relatively capital intensive.

U.S. Pat. No. 5,510,017 discloses a gas-liquid separator involving two sets of concentric, radially arranged vanes, which cause a swirling flow of liquid-containing gas directed therethrough. The centrifugal forces generated cause liquid droplets to impinge upon the walls of the pipe section containing the separator, from which they are removed as bulk liquid by a series of drains. This device is of rather complex construction, and is believed to be useable only when configured for horizontal flow due to the placement of liquid-trapping baffles and drains. Moreover, conversion of linear flow to a swirling flow necessarily requires energy, which is manifested as a pressure drop.

EP 0 197 060 discloses a gas liquid separator useful in gas desulfurizing, which employs a plurality of groups of obliquely mounted large surface area slats which are sprayed with a rinsing liquid to carry away droplets impinging upon the slats. Use of a rinsing liquid is undesirable in many applications.

U.S. Pat. No. 7,004,998 (the '998 patent) discloses a gas-liquid separator that is referred to as a fishbone separator because the construction of it involves a central spine from which emanates a plurality of vanes for collecting liquid droplets. The fishbone construction described in the '998 patent is limited in that it is placed in the upstream (inlet) region of an elbow where the centerline of the elbow inlet is substantially vertical. This limitation is significant in that the conduit system carrying the gas exiting polymerization reactors tend to be large and inflexible offering only a limited number of available conduit positions for placing the gas-liquid separator. In some conduit layouts the upstream (inlet) region of an elbow may not be accessible, or an elbow as such may not be present in the conduit system.

U.S. patent application Ser. No. 11/155,756 (the '756 application) discloses a liquid separator adapted to be inserted into a conduit. The gas-liquid separation enhancer of the '756 application includes downward sloping vanes and an optionally return channel. The vanes of the '756 application are arranged in a simple fishbone pattern. The vanes may have an opening along the length of the vanes, and a bottom lip to channel accumulated liquid to the conduit wall or to sloped return channels. The '756 application utilizes sloped return channel/channels to return the captured droplets to the vessel from which the gas stream originated. With a central return channel, the vanes can be attached directly to the channel with the resulting assembly having a fishbone shape. The '756 application also discloses vanes that can be attached to a central plate or spine with the resulting spine-vanes assembly again having a simple fishbone shape. With all separation devices, an important goal is to reduce the amount of carryover with the least amount of pressure drop possible.

Accordingly, there is a need for a gas-liquid separator with improved collection efficiency and lower pressure drop that returns the captured liquid to the vessel from which the liquid originated.

SUMMARY OF THE INVENTION

The present invention solves one or more problems of the prior art by providing in one embodiment, a gas liquid separation enhancer that can be placed within a conduit attached to a polymerization reactor. The gas-liquid separation enhancer of the present embodiment is advantageously used to separate a liquid from a flowing gas stream having gas and liquid droplets by directing the gas stream into and through the gas-liquid separation enhancer. The separation enhancer includes a bent conduit section that redirects stream from a first average direction to a second average direction. The separation enhancer of this embodiment further comprises a plurality of longitudinally extending turning vanes distributed within the bent conduit section. At least a portion of the vanes have a bend that redirects a portion of the flowing gas stream from an initial direction substantially parallel to a first average direction to a final direction substantially parallel to a second average direction. Moreover, each of the vanes has a first end and a second end. The vanes are positioned in the bent conduit section to direct a portion of any liquid contacting the vanes to either the first end or the second end when the gas-liquid separation enhancer is incorporated into an outlet conduit from which stream exits. The present embodiment includes variations with and without a central spine about which the vanes are distributed.

In another embodiment, an outlet conduit having two or more gas-liquid separation enhancers is provided. The outlet conduit of this embodiment includes the gas-liquid separation enhancer having turning vanes set forth above and one or more additional separation enhancers upstream or downstream (from the enhancer having turning vanes) in the outlet conduit. The one or more additional separation enhancers may include turning vanes or non-turning vanes or combinations thereof.

In still another embodiment, a method of separating liquid droplets from a flowing stream having liquid droplets entrained in a gas. The method of the present embodiment comprises directing the flowing stream through the gas-liquid separation enhancers of the present invention as set forth above. The flowing stream contacts the turning vanes. A portion of the liquid droplets are impinged upon a surface of the vanes and are thereby collected. The collected liquid is then directed back into a vessel or reactor from which they originally emanated.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1:
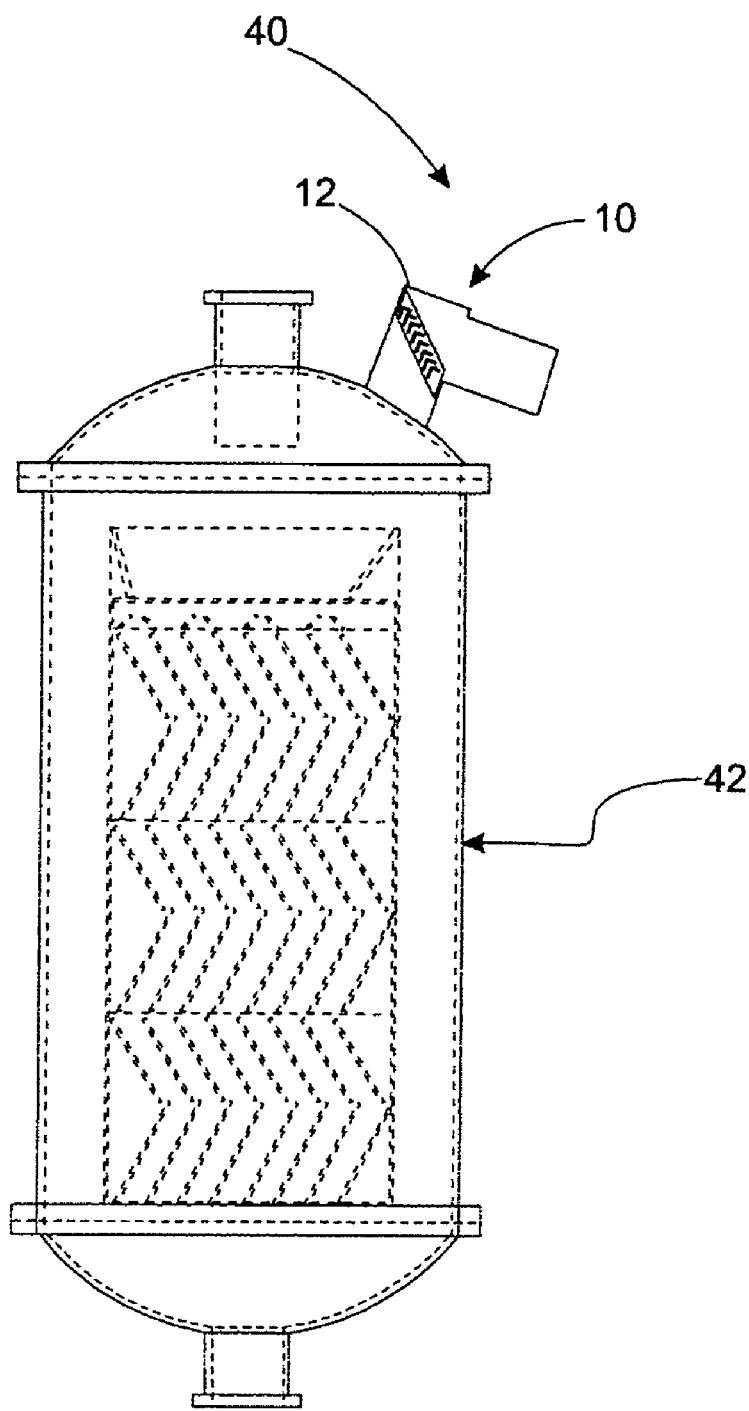
FIG. 1 is a schematic illustration of a reactor with a gas takeoff incorporating the gas-liquid separation enhancer of the invention.
Figure 2:
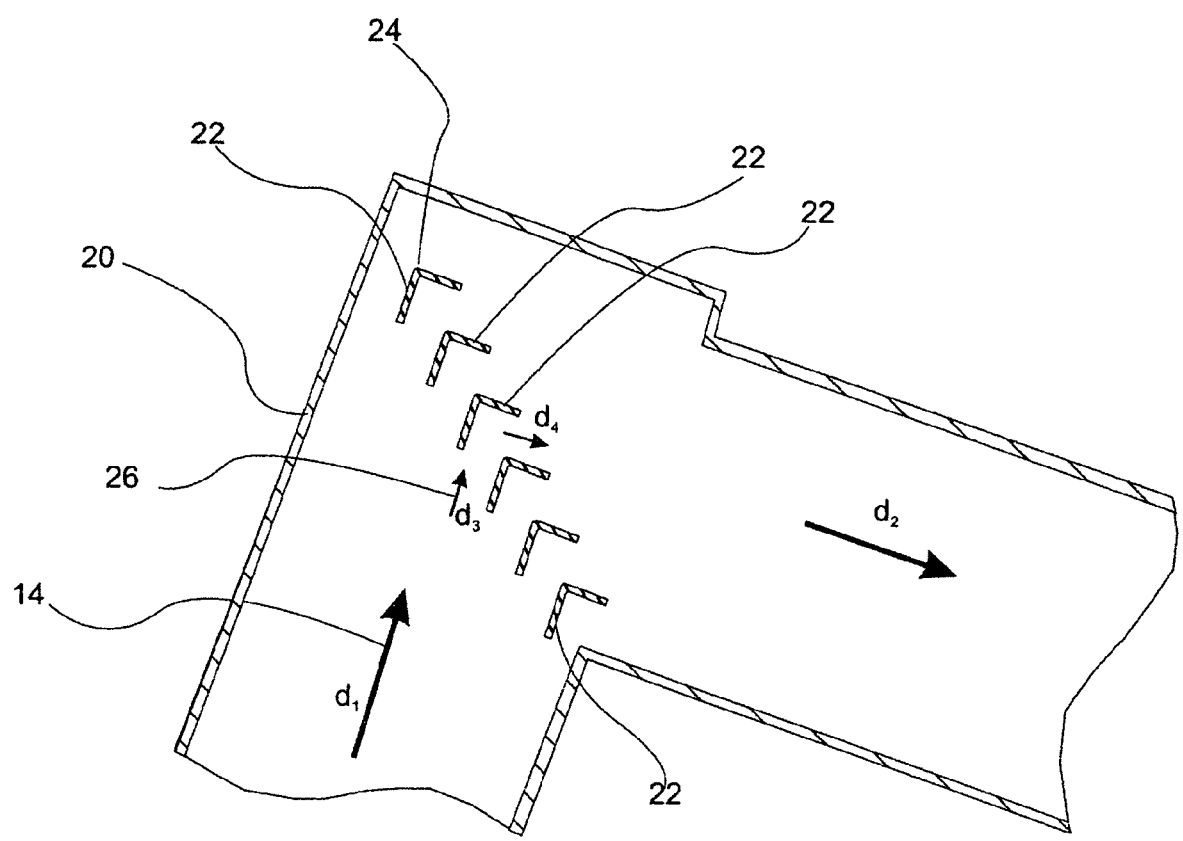
FIG. 2 is a cross-sectional view of a conduit section incorporating an embodiment of the gas-liquid separation enhancer of the present invention.
Figure 3A:
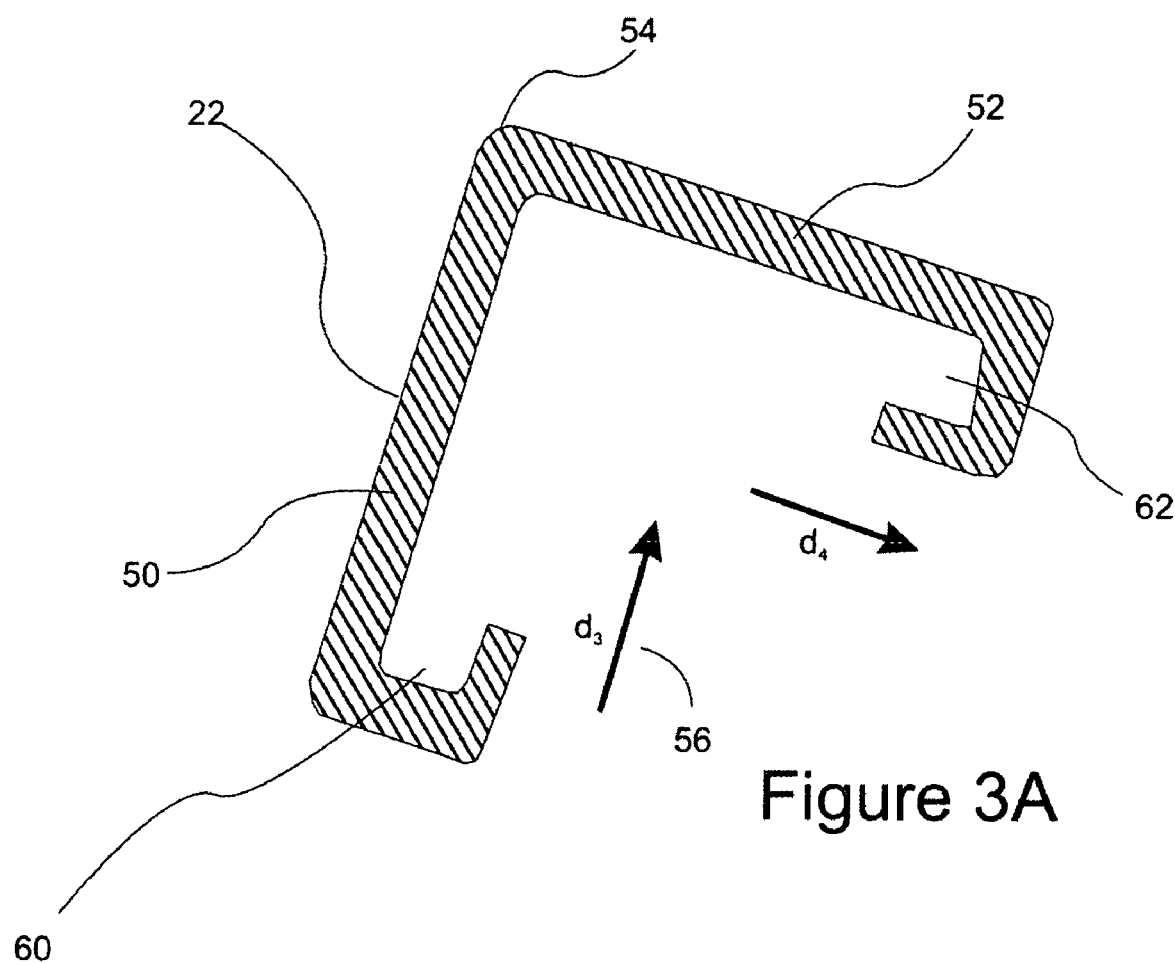
FIG. 3A is a cross-sectional view of a turning vane used in an embodiment of the gas-liquid separation enhancer of the invention.
Figure 3B:
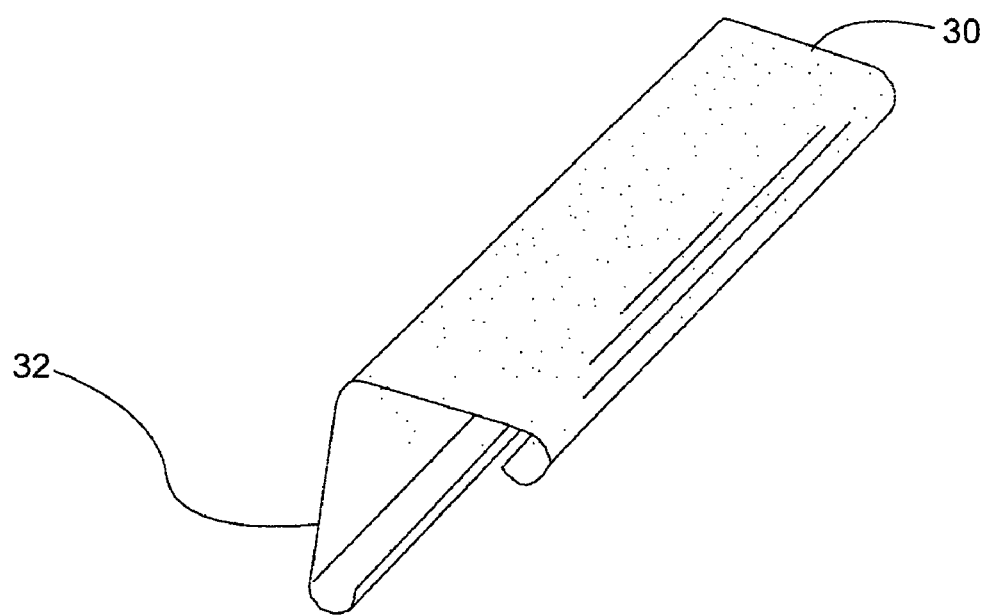
FIG. 3B is a perspective view of a turning vane used in an embodiment of the gas-liquid separation enhancer of the invention.

With reference to FIGS. 1, 2, 3A, and 3B, schematic illustrations of an embodiment of the gas-liquid separation enhancer of the present invention are provided. FIG. 1 is a schematic illustration of a reactor with a gas takeoff incorporating the gas-liquid separation enhancer of the invention. FIG. 2 is a cross-sectional view of a conduit section incorporating the gas-liquid separation enhancer. FIG. 3A is a cross-sectional view of a turning vane used in an embodiment of the gas-liquid separation enhancer of the invention. FIG. 3B is a perspective view of a turning vane used in an embodiment of the gas-liquid separation enhancer of the invention. The gas-liquid separation enhancer of the present embodiment is advantageously used to separate a liquid from a flowing gas stream having gas and liquid droplets by directing the gas stream into and through the gas-liquid separation enhancer. Separation enhancer 10 includes bent conduit section 12 that redirects stream 14 from first average direction $d_1$ to second average direction $d_2$. Bent conduit 12 is defined by peripheral conduit wall 20. Examples of configurations that can be used for bent conduit section 12 include standard tee, standard elbows, and mitered bends. Separation enhancer 10 further comprises a plurality of longitudinally extending vanes 22 distributed within bent conduit section 12. One or more of vanes 22 have bend 24 that redirects a portion 26 of stream 14 from initial direction $d_3$ substantially parallel to first average direction $d_1$ to final direction $d_4$ substantially parallel to second average direction $d_2$. Vanes are positioned to provide a surface to contact the stream having gas and liquid droplets. Moreover, each of vanes 22 is positioned to provide substantially maximal contact with the stream having gas and liquid droplets. One or more of vanes 22 have first end 30 and second end 32. At least one of vanes 22 are positioned to direct a portion of any liquid contacting the vanes to either first end 30 or second end 32 when the gas-liquid separation enhancer 10 is incorporated in outlet conduit (i.e., gas takeoff) 40 from which stream 14 exits. In a variation, stream 14 emerges from reactor 42. In other variations, reactor 42 is a vessel. In a specific variation, reactor 42 is a polymerization reactor.

With reference to FIGS. 3A and 3B, one or more vanes 22 include first section 50 and second section 52. First section 50 and second section 52 are configured to define at least a portion of bend 54 such that portion 56 of the stream incident upon the first section is redirected along the second section. Bend 54 defines a curvature defined by a first radius of curvature. In a variation, bent conduit 12 includes a bend defining a second radius of curvature such that the first radius of curvature is from about 0.2 to about 1.3 times the second radius of curvature. In a refinement of the present invention, vanes 22 include lips 60, 62 which provide a conduit for transporting captured liquid towards first end 30 or second end 32 depending on the orientation of vanes 22.

Figure 4:
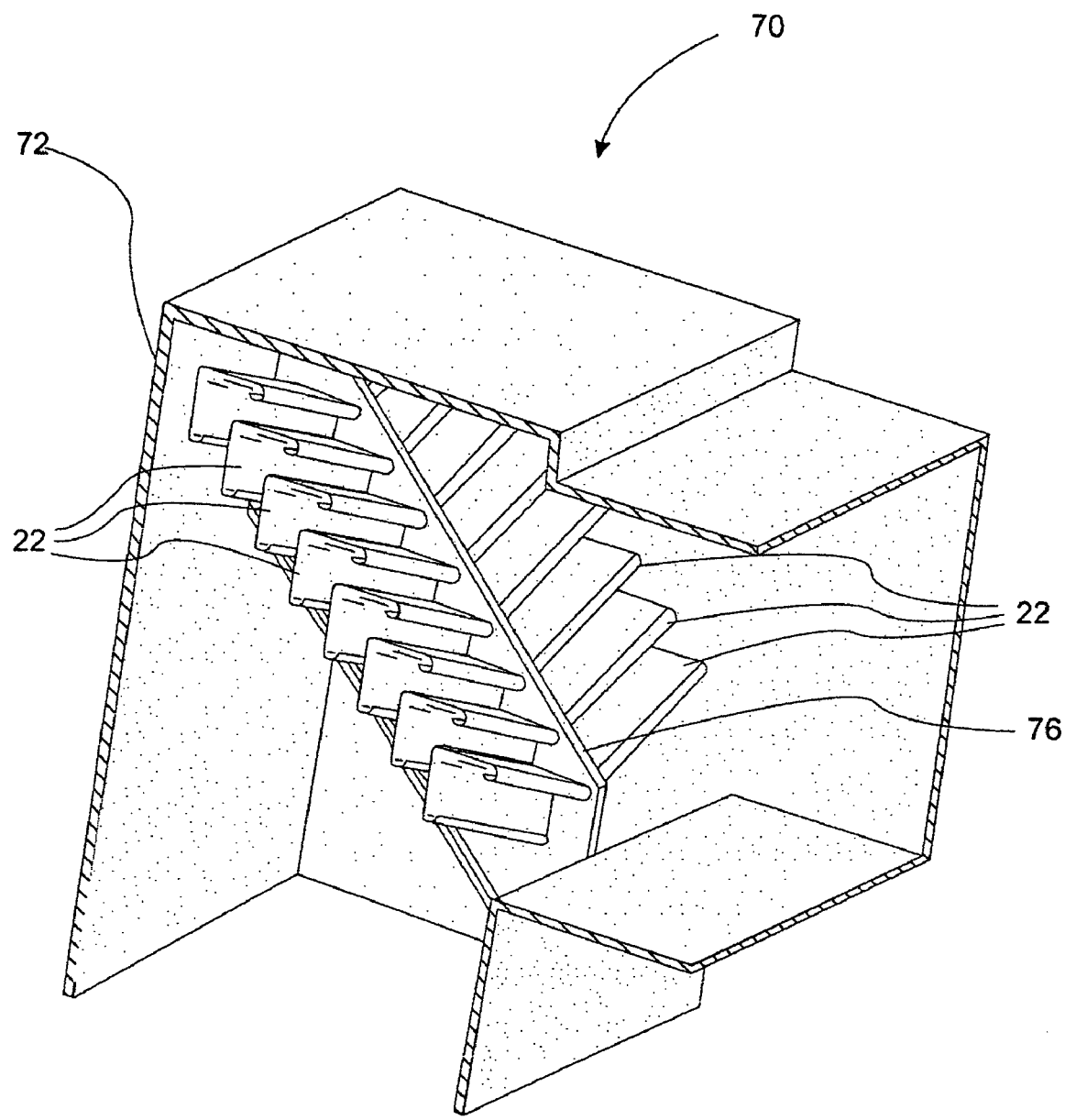
FIG. 4 is a perspective view of an embodiment of separation enhancer with a central spine.
Figure 5:
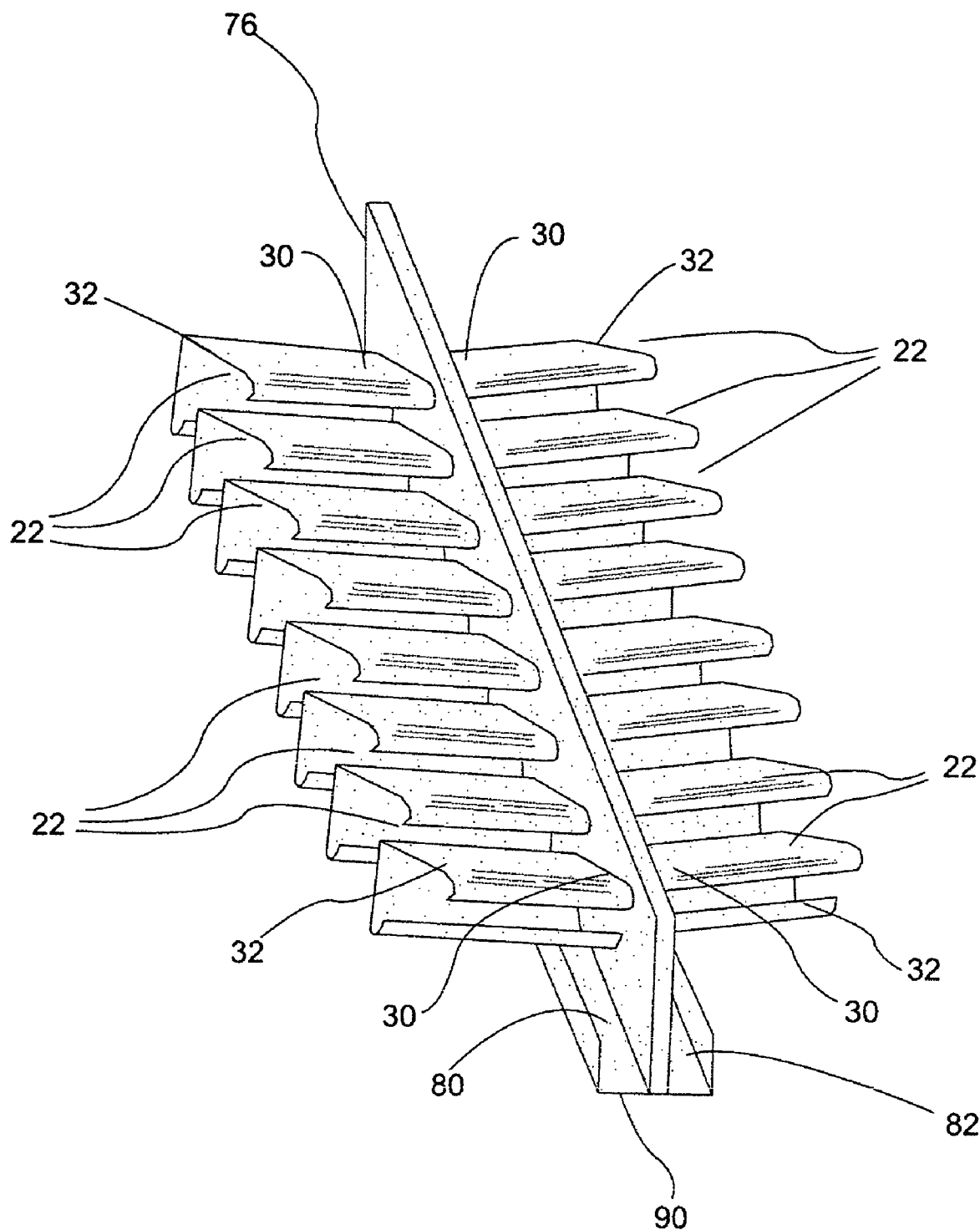
FIG. 5 is a perspective view of the distribution of vanes about a central spine in the separation enhancer of FIG. 4.

With reference to FIGS. 1, 4 and 5, an embodiment of the present invention in which a distribution of vanes with a central spine that is usable in a liquid-gas separation enhancer is schematically illustrated. FIG. 4 is a perspective view of a separation enhancer with a central spine positioned in a rectangular or square bent conduit. A wall is removed from FIG. 4 to reveal the internal distribution of vanes. FIG. 5 is a perspective view of the distribution of vanes around a central spine. Separation enhancer 70 includes bent conduit 72, which is of a rectangular or square cross-section. It should be appreciated that bent conduits of virtually any cross-section are usable, including but not limited to, substantially round or elliptical cross-sections. In the present variations, vanes 22 are distributed about and on both sides of central spine 76 in a fishbone pattern. Because the vanes 22 redirect (i.e. turn) the gas flow, the separation enhancers of the present invention are sometimes referred to as "turning vane fishbone enhancers" while the prior art enhancers of U.S. Pat. No. 7,004,998 and U.S. patent application Ser. No. 11/155,756 are referred to as "simple fishbone enhancers." In a variation of the present embodiment, central spine includes one or more liquid collecting lips or channels 80, 82. In one refinement of this variation, one or more of vanes 22 are positioned to direct a portion of any liquid contacting the vanes to first end 30 and into channels 80, 82. Channels 80, 82 are at an angle with respect to a horizontal plane so that captured liquid moves toward end 90 and draining back into reactor 42. Specifically, liquid that enters channels 80, 82 is directed in a downward direction under the force of gravity and into reactor 42 when the separation enhancer is incorporated into outlet conduit 40.

Figure 6A:
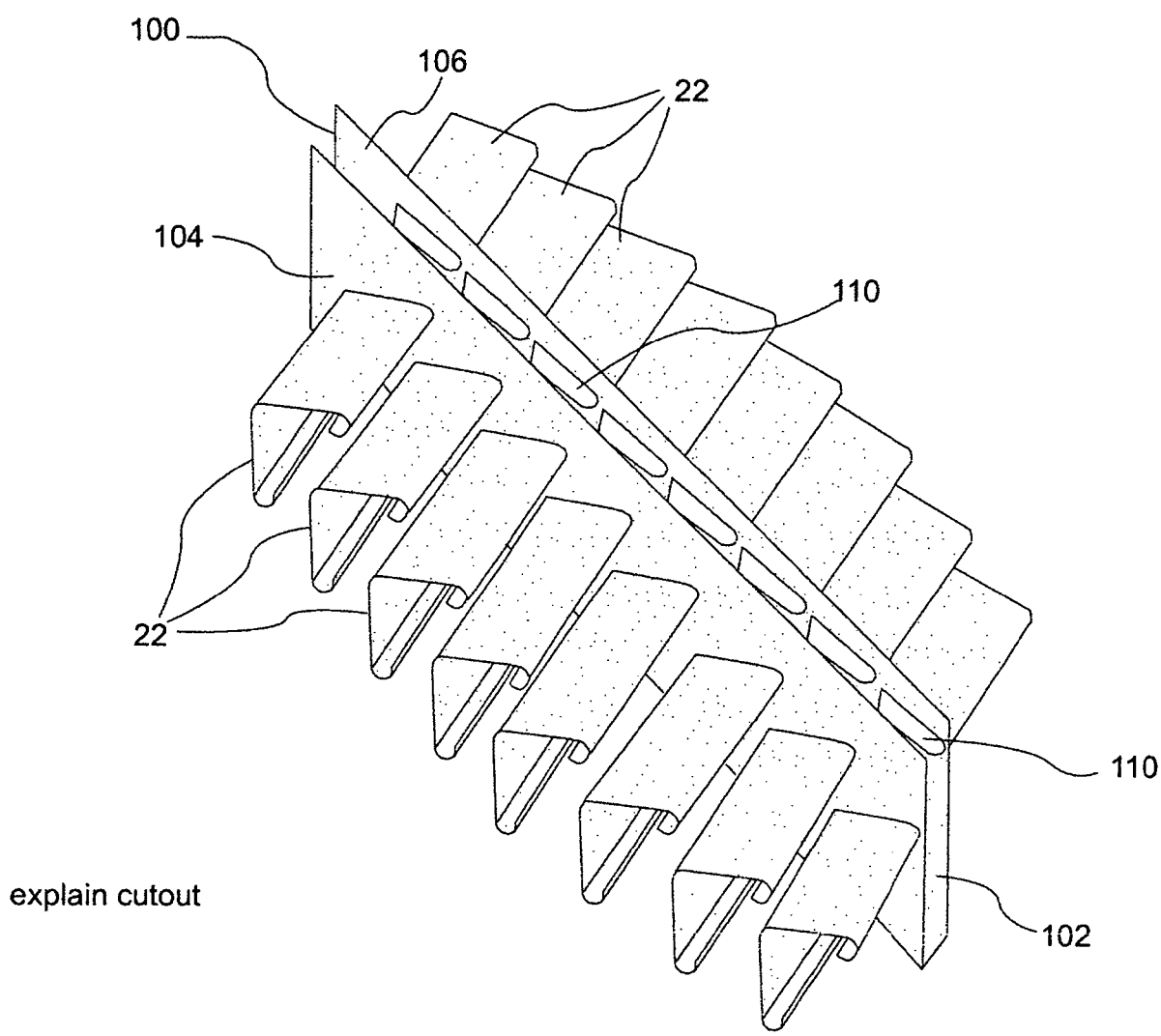
FIG. 6A is a perspective view of a vane assembly that is usable in variations of the gas-liquid separation enhancer of the present invention.
Figure 6B:
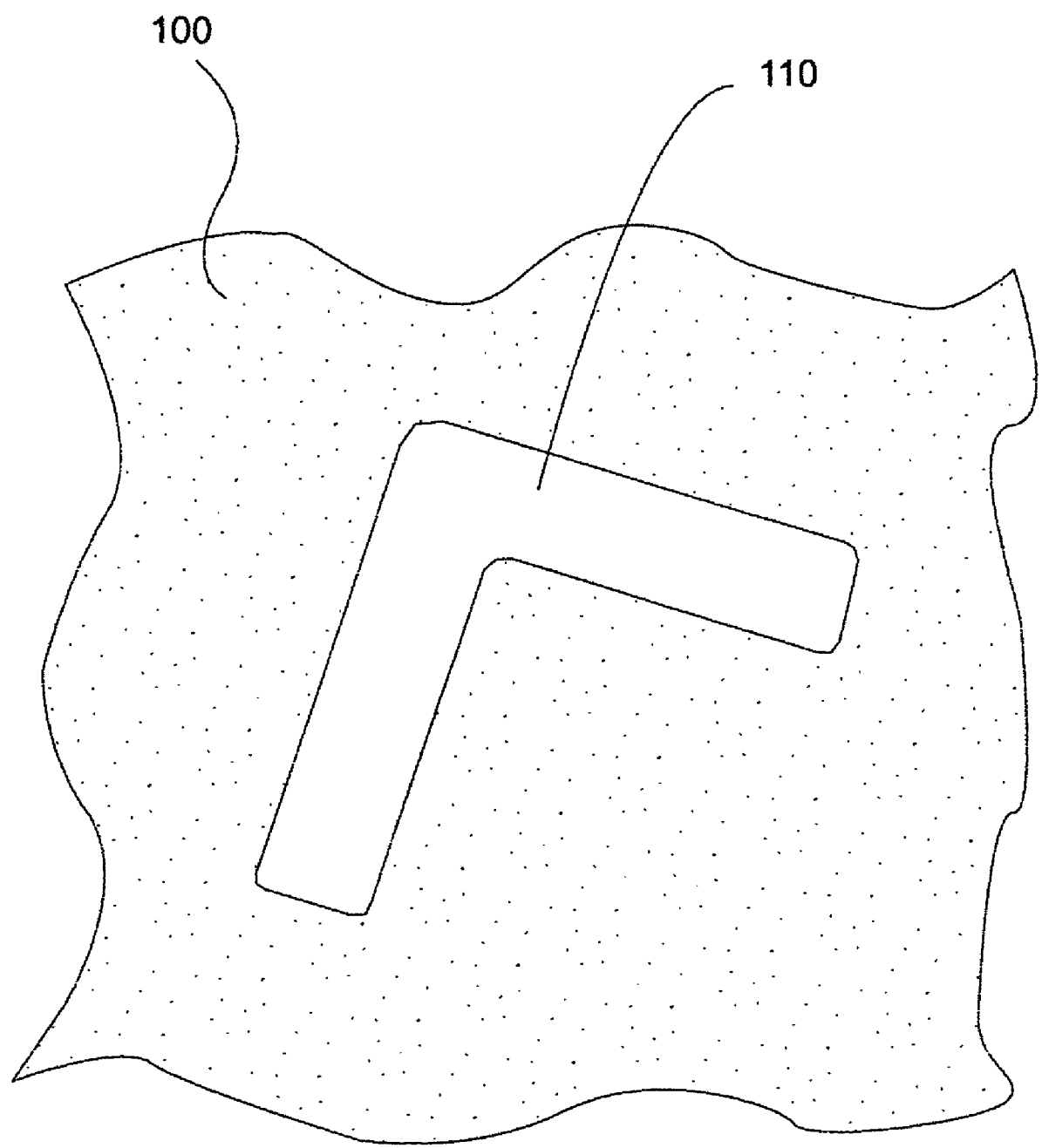
FIG. 6B is a side view of a cutout useable in the vane assembly of FIG. 6A.

With reference to FIGS. 6A and 6B, another variation of a separation enhancer with a central spine is schematically illustrated. FIG. 6A provides a perspective view of a vane assembly that is usable in variations of the gas-liquid separation enhancer of the present invention. In this variation, vanes 22 are arranged about central spine 100. Central spine 100 includes internal channel 102 into which liquid captured by vanes 22 enters. Vanes 22 are angled such that liquid flows downward from second end 32 towards first end 30 and into internal channel 102. In a refinement, vanes 22 are attached to walls 104, 106 of central spine 100. Moreover, central spine 100 has cutouts 110 that allow liquid to pass from vanes 22 into internal channel 102. FIG. 6B shows detail of cutout 110.

Figure 7:
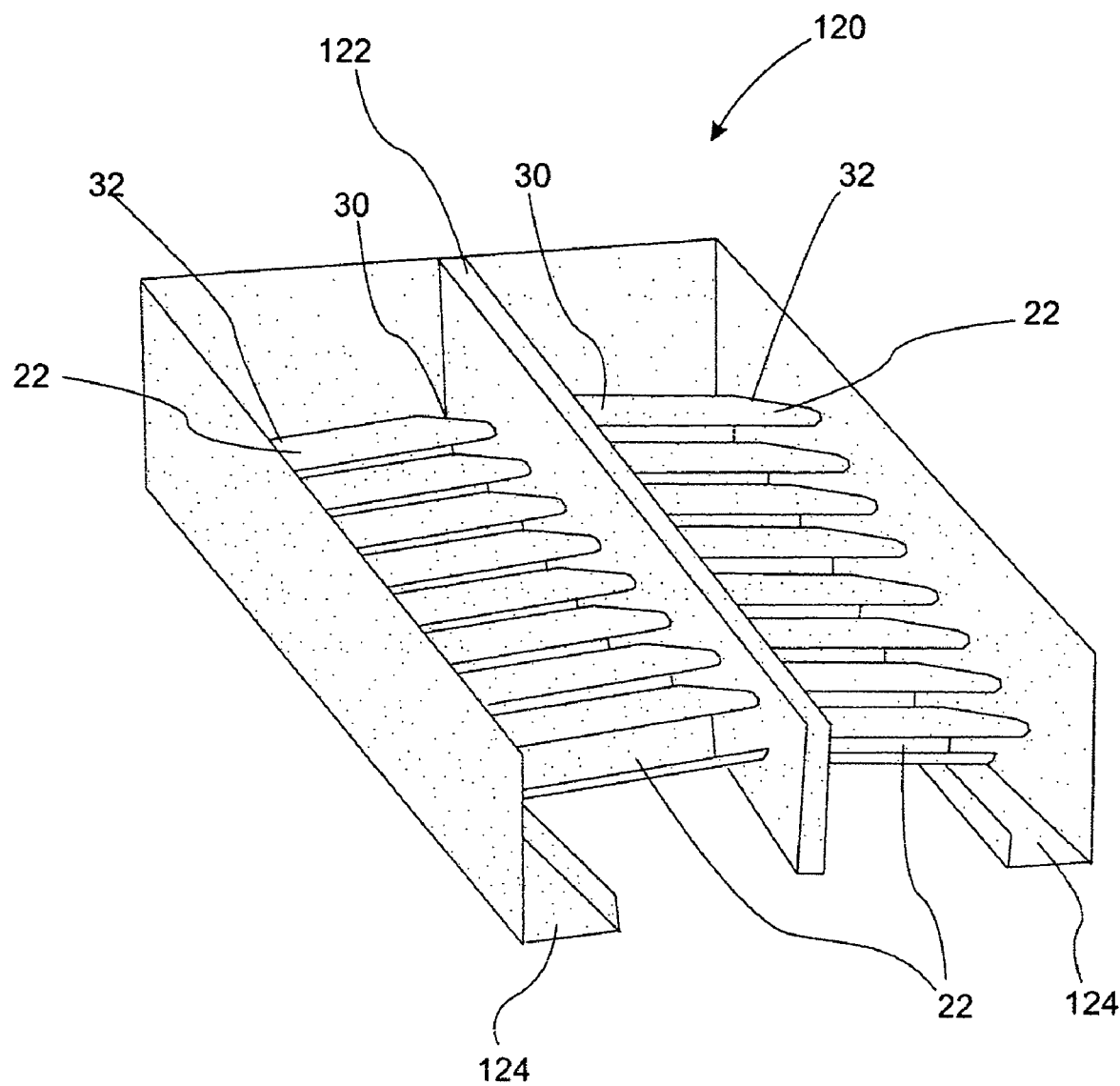
FIG. 7 is a schematic illustration showing a perspective view of a separation enhancer with a peripheral return channel.

With reference to FIG. 7, a schematic illustration showing a perspective view of a separation enhancer with a peripheral return channel is provided. In separation enhancer 120, vanes 22 are positioned to direct a portion of any liquid contacting the vanes toward second end 32 away from first end 30 and central spine 122. In a refinement of this variation, separation enhancer 120 includes peripheral return channel 124 that directs liquid in a downward direction. In a variation of the invention, peripheral return channel 124 is positioned in front of second end 32 of each vane of the plurality of vanes 22, and adjacent to an inner wall of the conduit in which separation enhancer is placed.

Figure 8A:
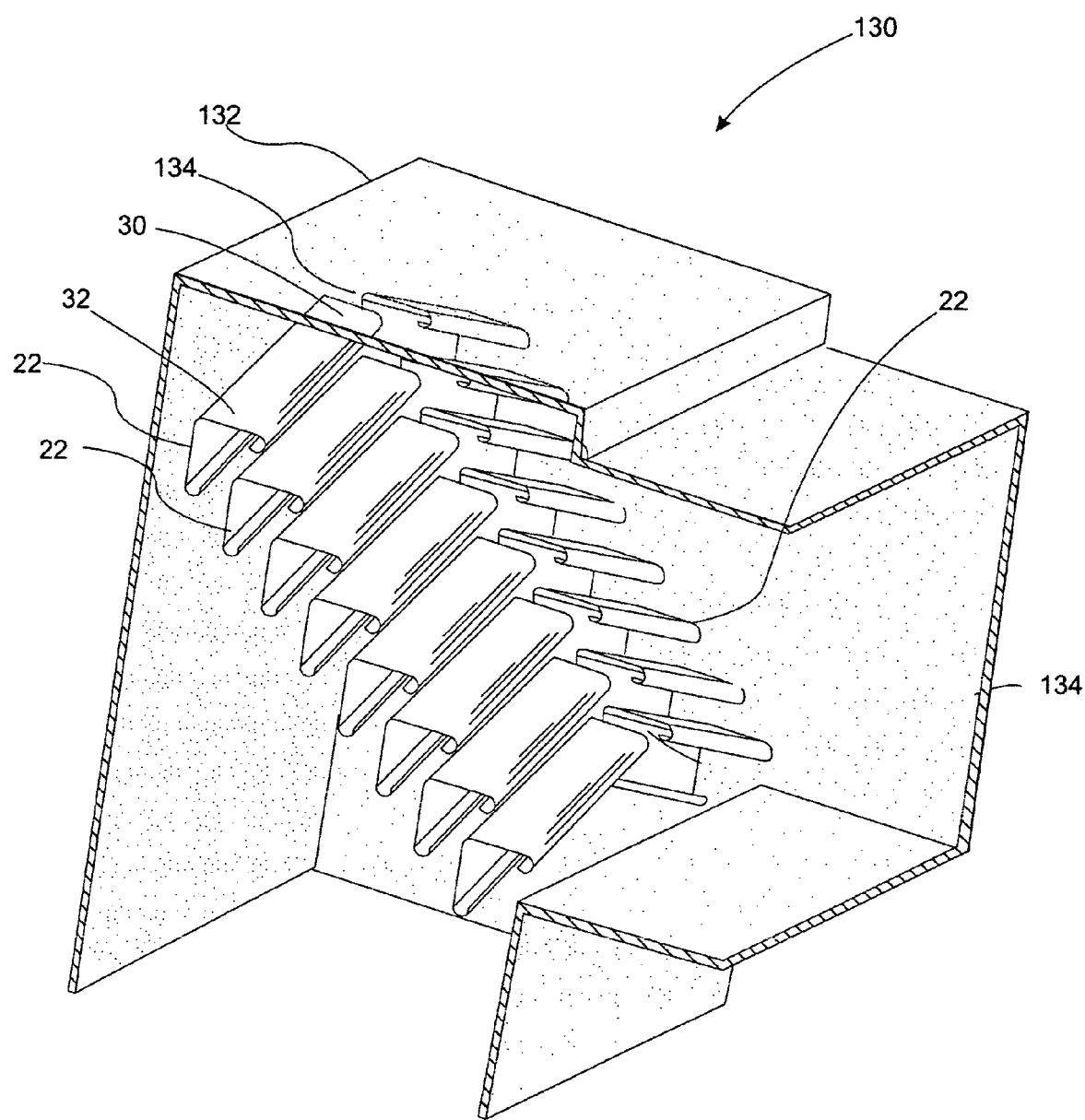
FIG. 8A is a schematic illustration showing a perspective view of an embodiment of a separation enhancer without a central spine.

With reference to FIG. 8A, an embodiment of the present invention in which a distribution of vanes without a central spine usable in a separation enhancer is schematically illustrated. FIG. 8A provides a schematic illustration showing a perspective view of the separation enhancer of this embodiment. A wall is removed in FIG. 8A to reveal the interior distribution of vanes. Separation enhancer 130 includes bent conduit 132, which is of a rectangular or square cross-section. It should be appreciated that bent conduits of virtually any cross-section are usable, including but not limited to, substantially round or elliptical cross-sections. In the present variations, vanes 22 are distributed about and on both sides of central space 134. In a variation, one or more of vanes 22 are positioned to direct a portion of any liquid contacting the vanes away from second end 32 towards first end 30 through space 134 and downward into reactor 42. In another variation, one or more of vanes 22 are positioned to direct a portion of any liquid contacting the vanes away from first end 30 towards second end 32 at which point the liquid falls downward into reactor 42. In a refinement of this latter variation, separation enhancer 130 includes a peripheral return channel as set forth above in connection with the description of FIG. 7.

Figure 8B:
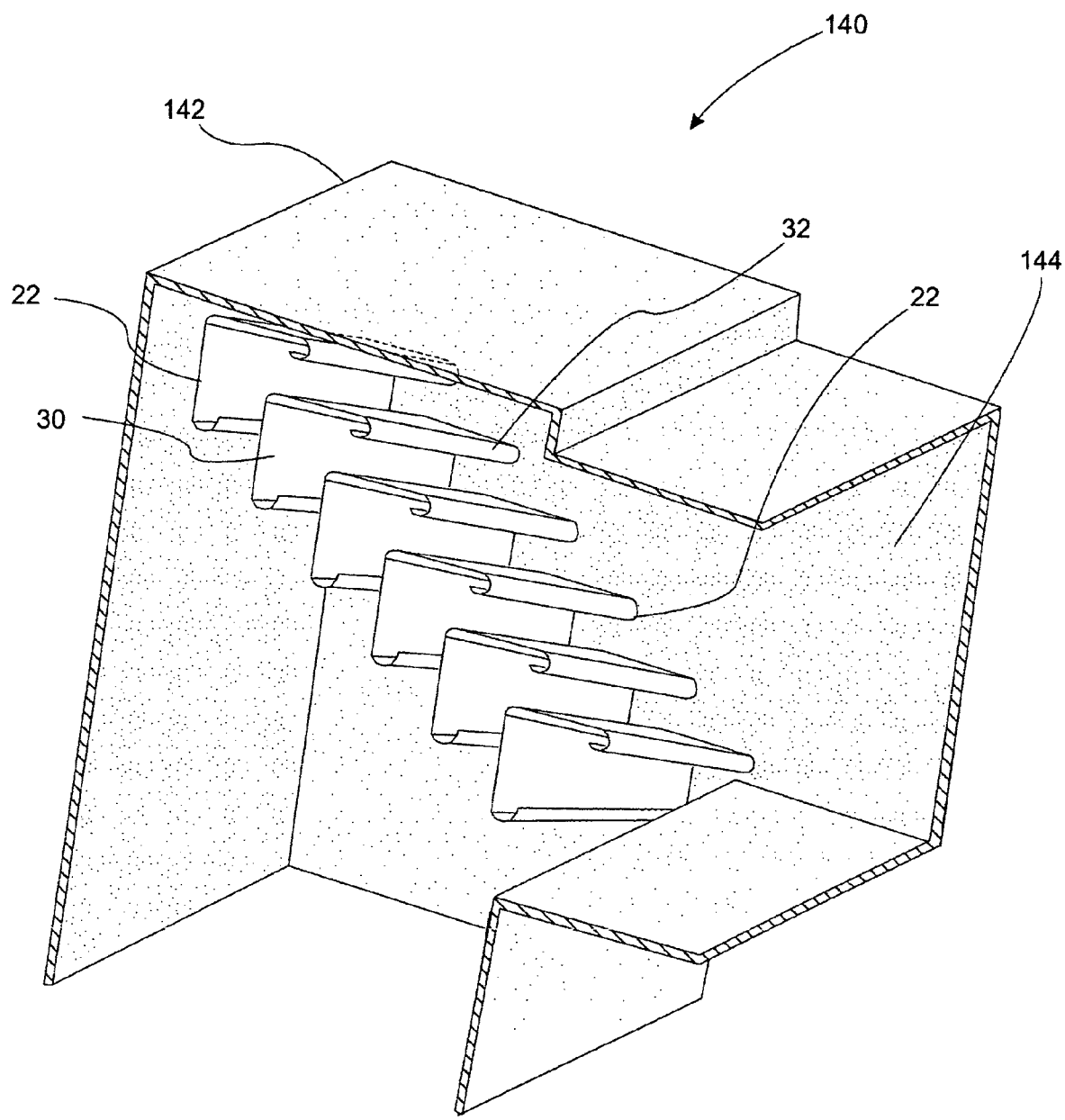
FIG. 8B is a schematic illustration showing a perspective view of another embodiment of separation enhancer without a central spine.

With reference to FIG. 8B, another embodiment of the present invention in which a distribution of vanes without a central spine usable in a separation enhancer is schematically illustrated. FIG. 8B provides a schematic illustration showing a perspective view of the separation enhancer of this embodiment. A wall removed in FIG. 8B reveals the interior distribution of vanes. Separation enhancer 140 includes bent conduit 142, which is of a rectangular or square cross-section. It should be appreciated that bent conduits of virtually any cross-section are usable, including but not limited to, substantially round or elliptical cross-sections. In the present variations, vanes 22 are attached to wall 144. In a variation, one or more of vanes 22 are positioned to direct a portion of any liquid contacting the vanes away from first end 30 towards second end 32 and towards wall 144. In another variation, one or more of vanes 22 are positioned to direct a portion of any liquid contacting the vanes away from second end 32 towards first end 30 at which point the liquid falls downward into reactor 42. In this variation, the vanes slope downward from second end 32 to first end 30 (not shown). In a refinement of this latter variation, separation enhancer 130 includes a peripheral return channel as set forth above in connection with the description of FIG. 7.

Figure 9:
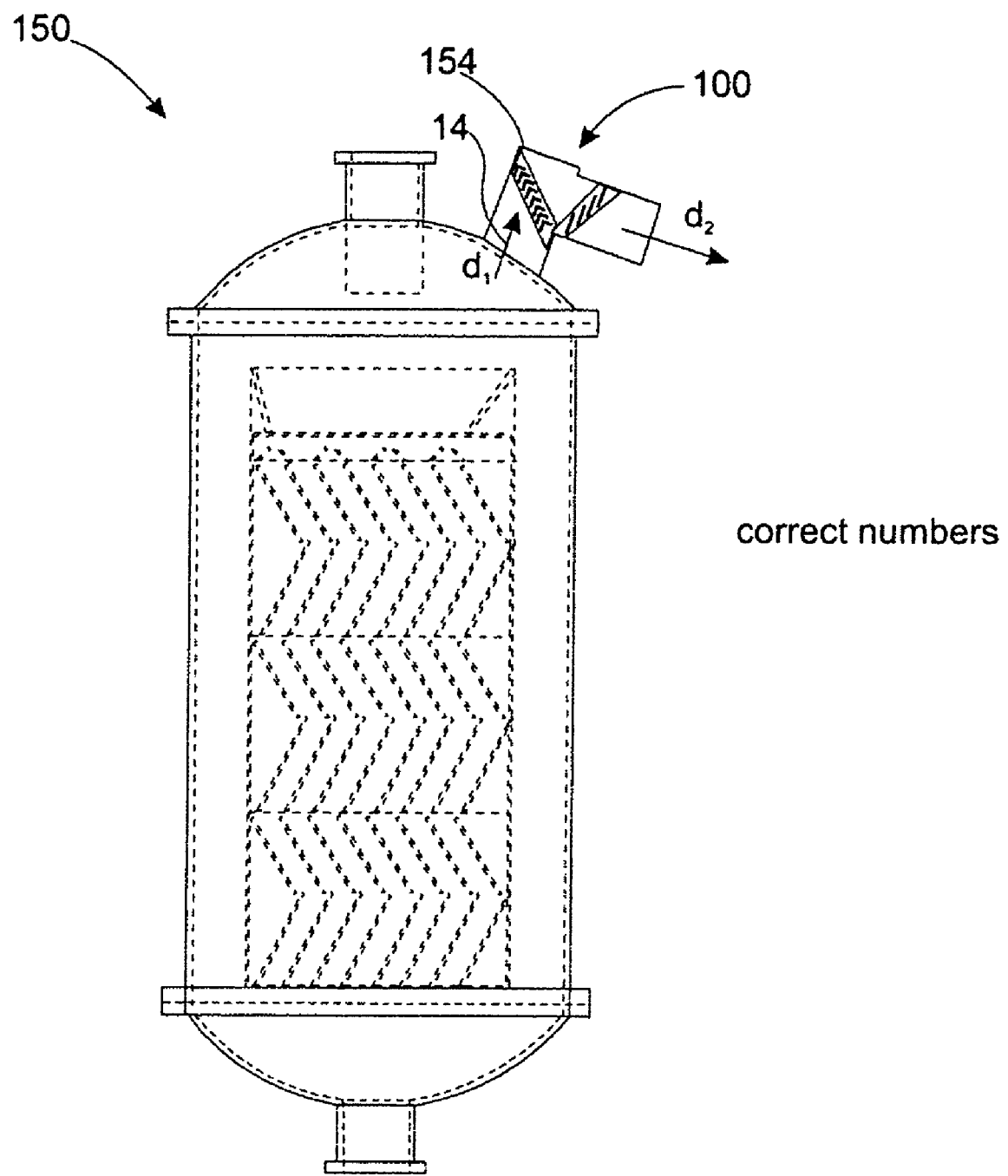
FIG. 9 is a schematic illustration showing a reactor incorporating two gas-liquid separation enhancers with a turning vane enhancer upstream of a separation enhancer having non-turning vanes.
Figure 10:
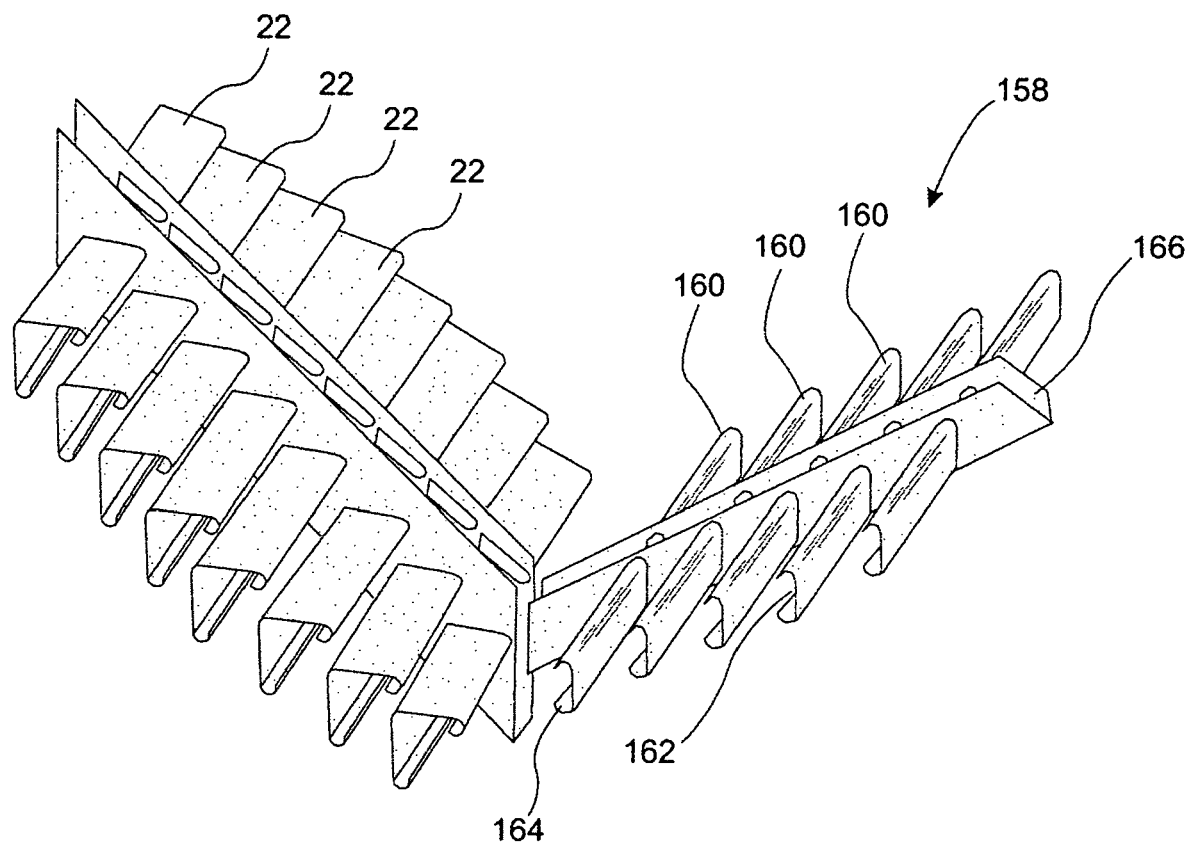
FIG. 10 is a schematic illustration showing additional detail of the separation enhancers of FIG. 9.

With reference to FIGS. 9 and 10, an embodiment of the present invention incorporating two or more gas-liquid separation enhancers into an exit conduit of a reactor is provided. FIG. 9 is a schematic illustration of an example of a polymerization reactor incorporating the enhancers of this embodiment with a turning vane enhancer upstream of a separation enhancer having non-turning vanes. Reactor 150 includes separation enhancer 10 as set forth above. Separation enhancer 10 includes bent conduit section 12 that redirects stream 14 from first average direction $d_1$ to second average direction $d_2$. Separation enhancer 10 further comprises a plurality of longitudinally extending vanes 22 distributed within bent conduit section 12 as set forth above. The details of which as set forth above in connection with the description of FIGS. 1 through 8. Also positioned in conduit 12 is a second separation enhancer 158. Advantageously, the design of useful separation enhancer 158 is provided in U.S. patent application Ser. No. 11/155,756. Moreover, the gas-liquid separators of U.S. Pat. No. 7,004,998 can also be used in tandem with the separation enhancers. The details of each of these references is hereby incorporated by reference in their entirety. FIG. 10 provides a schematic illustration of the positioning of vanes within the two separation enhancers. Separation enhancer 10 includes vanes 22 as set forth above. Separation enhancer 158 includes a plurality of vanes 160, which collect liquid via surfaces 162. Collected liquid accumulates in collecting lips or channels 164 and is directed into central channel 166.

Figure 11:
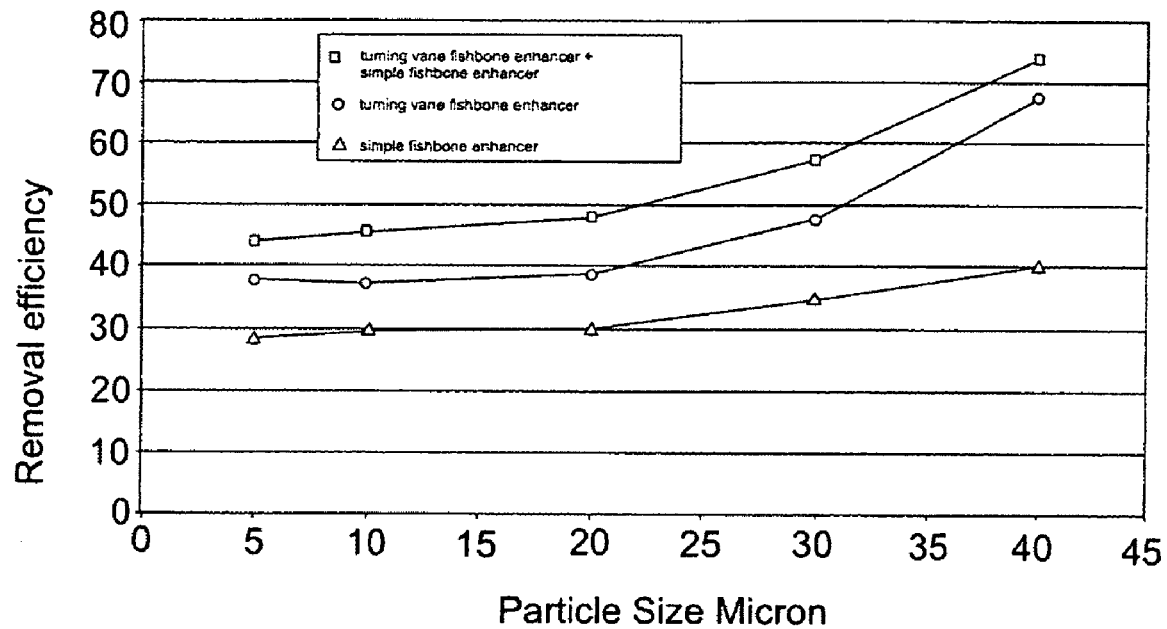
FIG. 11 provides the removal efficiency of liquid droplets having a diameter from 5 to 40 micron by various separation enhancer configurations.

FIG. 11 plots the removal efficiency of liquid droplets having a diameter from 5 to 40 micron by various separation enhancers. The utilization of a gas-liquid separation enhancer of the present invention in tandem with a separation enhancer with non-turning vanes is found to have an even higher removal efficiency.

Figure 12:
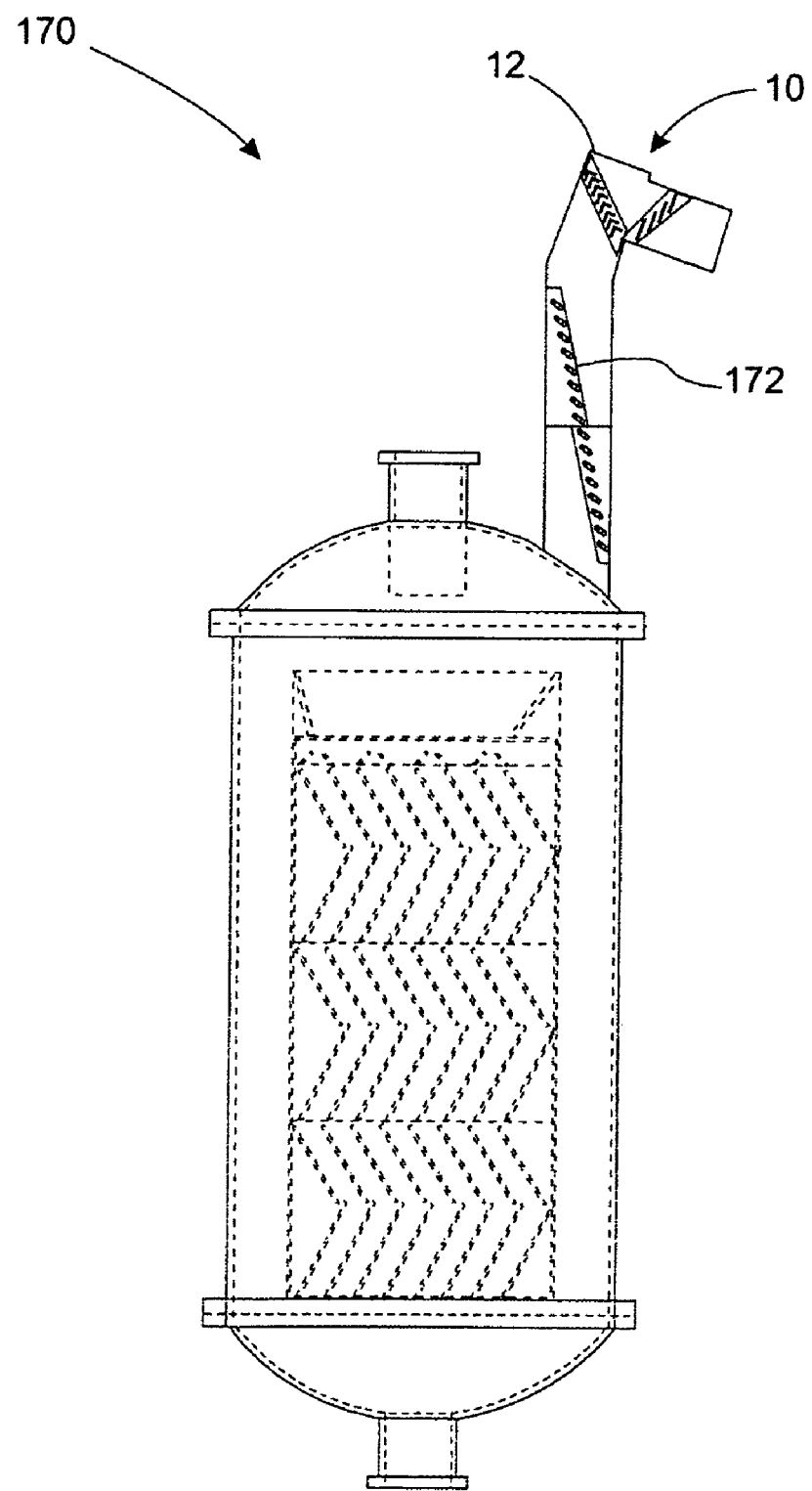
FIG. 12 provides a schematic illustration of an embodiment of the present invention incorporating two or more gas-liquid separation enhancers into a gas takeoff conduit.

With reference to FIG. 12, an embodiment of the present invention incorporating two or more gas-liquid separation enhancers into an exit conduit of a reactor is provided. Reactor 170 includes separation enhancer 10 as set forth above. Separation enhancer 10 includes bent conduit section 12 that redirects stream 14 from first average direction $d_1$ to second average direction $d_2$. Separation enhancer 10 further comprises a plurality of longitudinally extending vanes 22 distributed within bent conduit section 12 as set forth above. The details of which are set forth above in connection with the description of FIGS. 1 through 8. Also positioned in conduit 12 is a second separation enhancer 172 located upstream of separation enhancer 10. Separation enhancer 172 includes non-turning vanes as set forth in U.S. patent application Ser. No. 11/155,756.

In addition to the embodiments described above, the separation enhancer may be fitted or connected to any vessel suitable for polymerizing reactants to make polymers or finish polymers in which a gas and liquid is evolved from a liquid reaction mixture or melt. Suitable vessels onto which the separation enhancer may be fitted or connected include those used to make polyethylene, poly(vinylchloride), polyisobutylene, polyamides including polycaprolactams, polyesters, polystyrene, polyisoprene, polycarbonates, polyoxyalkylene polyols, polyimides, polysulfides, polyphenylenes, polysulfones, polyolefins, polymethylbenzenes, acetal polymers, acrylic polymers, acrylonitrile polymers, fluoropolymers, ionomeric polymers, polyketones, liquid crystal polymers, polyenes, polyurethanes, and the like, and the copolymers thereof, and especially polycarbonates and polyesters (e.g., PET and the copolymers thereof) and the copolymers thereof. Also included are any other processes which make compounds instead of polymers such as acetyls, alcohols, fine chemicals, and pharma chemicals. The separation enhancer is useful to fit or connect to any reaction vessel in which gases are generated having different boiling points, one of the gases condensable or condensing on a surface without the application of applied heat energy to cool the gas.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gas-liquid separation enhancer for separating liquid from a stream having gas and liquid droplets, the separation enhancer comprising:
    a central spine:
    a bent conduit section that redirects the stream from a first average direction to a second average direction, the bent conduit being defined by a peripheral conduit wall; and
    a plurality of longitudinally extending vanes distributed within the bent conduit, one or more of the vanes having a bend that redirects a portion of the stream from an initial direction substantially parallel to the first average direction to a final direction substantially parallel to the second average direction, the one or more vanes having a first end and a second end wherein the vanes are positioned to direct a portion of any liquid contacting the vanes to either the first end or the second end, and the gas-liquid separation enhancer is incorporated in an outlet conduit from which the stream exits.

2. The separation enhancer of claim 1 wherein one or more vanes have a first section and a second section, the first section and second section configured to define at least a portion of the bend such that a portion of the stream incident upon the first section is redirected along the second section.

3. The separation enhancer of claim 2 wherein the bend has a curvature defined by a first radius of curvature.

4. The separation enhancer of claim 3 wherein the bent conduit includes a bend defining a second radius of curvature such that the first radius of curvature is from about 0.2 to about 1.3 times the second radius of curvature.

5. The separation enhancer of claim 1 wherein the central spine includes one or more channels.

6. The separation enhancer of claim 5 wherein one or more vanes are positioned to direct a portion of any liquid contacting the one or more vanes to the first end and into the one or more channels.

7. The separation enhancer of claim 6 wherein the one or more channels are at an angle with respect to a horizontal plane.

8. The separation enhancer of claim 5 wherein liquid entering the one or more channels is directed in a downward direction under the force of gravity and flow back into the vessel from which the liquid originated when the separation enhancer is incorporated in the outlet conduit.

9. The separation enhancer of claim 5 wherein one or more vanes are positioned to direct a portion of any liquid contacting the vanes to the second end away from the central spine.

10. The separation enhancer of claim 9 further comprising a peripheral return channel, the peripheral return channel directing liquid in a downward direction.

11. The separation enhancer of claim 10 wherein the peripheral return channel is positioned in front of the second end of each vane of the plurality of vanes and adjacent to an inner wall of the conduit.

12. The separation enhancer of claim 10 wherein the peripheral return channel is positioned behind the second end of each vane of the plurality of vanes and adjacent to an inner wall of the conduit.

13. The separation enhancer of claim 1 wherein one or more vanes are positioned to direct a portion of any liquid contacting the one or more vanes to the second end and the peripheral conduit wall.

14. The separation enhancer of claim 1 wherein each vane is positioned to provide a surface to contact the stream having gas and liquid droplets.

15. The separation enhancer of claim 14 wherein each vane is positioned to provide substantially maximal contact with the stream having gas and liquid droplets.

16. The separation enhancer of claim 1 wherein each vane has one or more fluid collecting lips.

17. A process for the separation of droplets of liquid from a flowing gas stream, comprising directing the gas stream into the separation enhancer of claim 1.

18. A gas-liquid separation enhancer for separating liquid from a stream having gas and liquid droplets, the separation enhancer comprising:
    a bent conduit section that redirects the stream from a first average direction to a second average direction, the bent conduit being defined by a peripheral conduit wall;
    a plurality of longitudinally extending vanes distributed within the bent conduit, one or more of the vanes having a bend that redirects a portion of the stream from an initial direction substantially parallel to the first average direction to a final direction substantially parallel to the second average direction, the one or more vanes having a first end and a second end wherein the vanes are positioned to direct a portion of any liquid contacting the vanes to either the first end or the second end, and the gas-liquid separation enhancer is incorporated in an outlet conduit from which the stream exits; and a peripheral return channel, the peripheral return channel directing liquid in a downward direction and into a polymerization reactor when the separation enhancer is incorporated in the outlet conduit, wherein one or more vanes are positioned to direct a portion of any liquid contacting the one or more vanes to the second end and the peripheral conduit wall.

19. A process for the separation of droplets of liquid from a flowing gas stream, comprising directing the gas stream into the separation enhancer of claim 18.

20. A gas-liquid separation enhancer for separating liquid from a stream having gas and liquid droplets, the separation enhancer positionable in a bent conduit section of a polymerization reactor outlet, the bent conduit section redirecting the stream from a first average direction to a second average direction, the separation enhancer comprising:

a central spine; and a plurality of longitudinally extending vanes distributed along the central spine, one or more of the vanes having a bend that redirects a portion of the stream from an initial direction substantially parallel to the first average direction to final direction substantially parallel to the second average direction, the one or more vanes having a first end and a second end wherein the vanes are positioned to direct a portion of any liquid contacting the vanes to either the first end or the second end.

21. The separation enhancer of claim 20 wherein the central spine includes one or more channels.

22. The separation enhancer of claim 21 wherein one or more vanes are positioned to direct a portion of any liquid contacting the one or more vanes to the first end and into the one or more channels.

23. The separation enhancer of claim 21 wherein the one or more channels are at an angle with respect to a horizontal plane.

24. The separation enhancer of claim 21 wherein liquid entering the one or more channels is directed in a downward direction under the force of gravity and into the polymerization reactor when the separation enhancer is incorporated in the outlet conduit.

25. The separation enhancer of claim 20 wherein one or more vanes are positioned to direct a portion of any liquid contacting the vanes to the second end away from the central spine.

26. The separation enhancer of claim 25 further comprising a peripheral return channel, the peripheral return channel directing liquid in a downward direction.

27. An outlet conduit from a polymerization reactor through which a stream having gas and liquid droplets flows, the outlet conduit comprising:

a first gas-liquid separation enhancer comprising:

a bent conduit section that redirects the stream from a first average direction to a second average direction, the bent conduit being defined by a peripheral conduit wall;

a plurality of longitudinally extending vanes distributed within the bent conduit, one or more of the vanes having a bend that redirects a portion of the stream from an initial direction substantially parallel to the first average direction to final direction substantially parallel to the second average direction, the one or more vanes having a first end and a second end wherein the vanes are positioned to direct a portion of any liquid contacting the vanes to either the first end or the second end and the gas-liquid separation enhancer is incorporated in an outlet conduit from which the stream exits a polymerization reactor; and a second gas-liquid separation enhancer positioned downstream or upstream of the first separation enhancer comprising:

a central return channel: and a plurality of longitudinally extending vanes distributed along the central return channel, each vane having a first end and a second end wherein each vane is positioned to direct a portion of any liquid contacting the vanes to the first end and into the central return channel, wherein liquid entering the central return channel is directed in a downward direction under the force of gravity, the direction being in an opposite sense to the flow direction of the stream having gas and liquid droplets.

28. The outlet conduit of claim 27 further comprises one or more additional gas-liquid separation enhancers.

* * * * *